(No Model.)
A. KRIEGER.
SAW TOOTH.
No. 292,659. Patented Jan. 29, 1884.
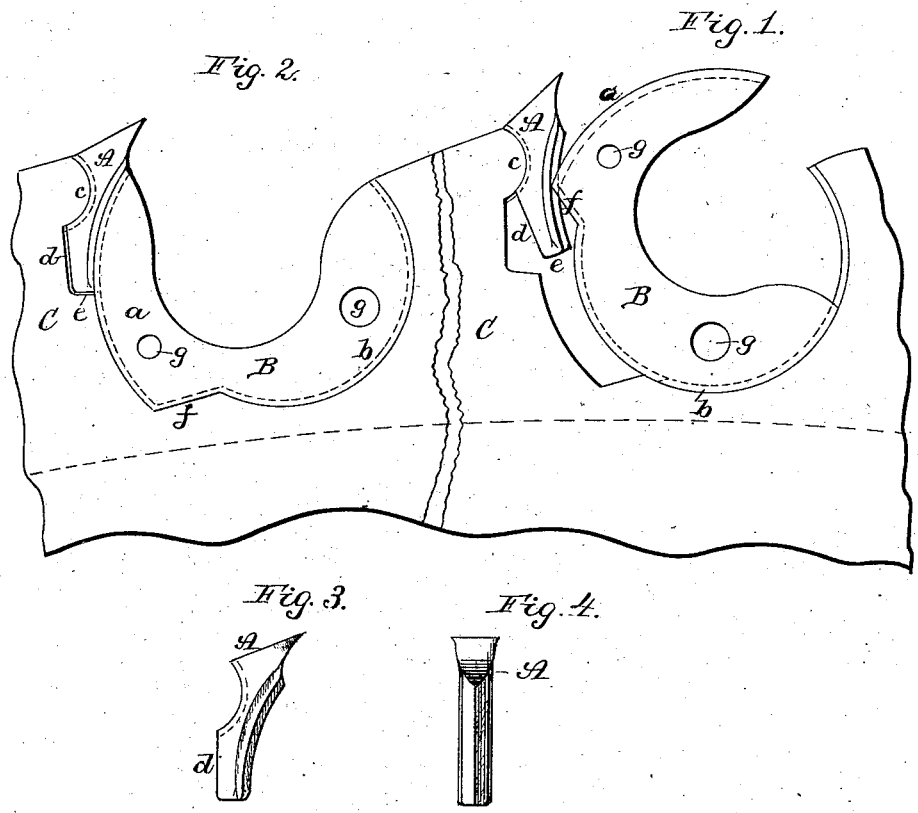

UNITED STATES PATENT OFFICE.

ANDREW KRIEGER, OF COLUMBUS, OHIO.

SAW-TOOTH.

SPECIFICATION forming part of Letters Patent No. 292,659, dated January 29, 1884.

Application filed October 5, 1883. (No model.)

*To all whom it may concern:*

Be it known that I, ANDREW KRIEGER, a citizen of the United States, residing at Columbus, in the county of Franklin and State of Ohio, have invented certain new and useful Improvements in Detachable Saw-Teeth, of which the following is a specification, reference being had therein to the accompanying drawings.

My invention consists of an improvement in detachable saw-teeth. A saw-tooth of a peculiar form and a clamping-piece to hold it are inserted in a suitable recess in a circular-saw plate, as will be fully described hereinafter.

The accompanying drawings represent my invention.

Figures 1 and 2 are side elevations, showing the manner of attaching the teeth to the saw-plate. Figs. 3 and 4 are detailed views.

The tooth A, made of bar-steel, is forged in a die. Its cutting-edge is in the form of a V, the under side of which is the continuation of the section of a circle, in which the clamping-piece B is held. In the back of the tooth is a semicircular recess, into which enters a projection of similar form on the saw-blade C, the recess and projection forming a ball-joint, $c$, and from this, which is about one-half of the whole length of the tooth, the back extends in a straight line, $d$, to the foot $e$. This straight line $d$ and foot $e$ of the tooth are under ordinary circumstances not in contact with the saw-plate C, there being a narrow space left vacant between, but the projection from the saw-plate in the ball-joint $c$ and the clamping-piece B press against the tooth from opposite sides. At the edge of the tooth is a V-shaped tongue, that enters a groove in the upper end of the clamping-piece, and in the semicircular recess of the tooth is a groove for a tongue on the saw-plate to enter. The circumference of the clamping-piece is divided into sections of two concentric circles, $a$ and $b$, of different diameters. The larger of them, $a$, bearing against the tooth, is joined by a straight line, $f$, to the smaller one, $b$. The upper and central parts of the clamping-piece B are removed, leaving enough of the material to resist a strong pressure. In the edge of the circumference of the clamping-piece is a groove, and on the edge of the saw-plate is a corresponding tongue, by which the clamping-piece is confined to its place. The two holes $g$ in the piece B are for the insertion of a tool to turn it in its groove, or to secure it in its position. The narrow vacant space between the straight portion $d$ of the tooth and saw-plate, and likewise at its foot $e$, is for the purpose of admitting into the recess teeth that vary slightly in size from each other. It is necessary to make this allowance, since it is very difficult to make teeth of exactly the same dimensions, without which they could not be placed in the recess. It also allows them to adjust themselves to the pressure of the clamping-piece when turned into its place. The abutment under the foot $e$ of the tooth serves as a check in case the cutting-edge should run against iron or other hard substances, by which it might be forced out of the ball-joint.

Instead of breaking the clamping-piece or the point of the saw-plate, the tooth itself would break at the ball-joint—its weakest place—and fall to the ground without injuring the saw. The ball-joint offers the advantage of the tooth being readily inserted, and of greatly reducing the friction between the saw-plate and the clamping-piece, when the latter is being turned to fasten or loosen the tooth. The tooth is first held in position in its recess in the saw-plate; then the tongue on the edge of the tooth is placed in the groove of section $a$ of clamping-piece B, so that the heel on the straight line $f$, by which the two circles $a$ and $b$ are connected, stands under the cutting-edge of the tooth, as shown in Fig. 1. If, now, the clamping-piece be turned down, the tooth, yielding to the pressure, which is constantly increasing, turns upward in the ball-joint as long as the pressure is exerted above the center of the joint, the foot of the tooth sliding forward out of its recess. By continuing to turn the clamping-piece downward, as soon as the heel of the section $a$ arrives on a line with the center of the joint, where it exerts the greatest pressure, the tooth returns to its former position, the foot moving back into its recess, and when the heel of the clamping-piece has arrived below the center of the joint, the pressure gradually diminishes until the clamping-piece reaches its seat.

From the foregoing it will be understood that the greatest pressure against the tooth is exerted opposite to the center of the ball-joint when the clamping-piece is turned into its recess, and again when removed from it. This pressure, increasing as soon as the clamping-piece begins to be turned down or upward from its seat, holds it in place and locks the tooth. When in operation, the resistance of the material to be sawed has a tendency to raise the point of the cutting-edge of the tooth, consequently to push out the foot, which, not being able to move in that direction, presses constantly against the clamping-piece, assisting thereby to hold it in its place.

Having thus described my invention, I claim—

1. The combination of the saw-plate, a removable saw-tooth, and a clamping plate or device, the upper end of the tooth being rigidly clamped between the saw-plate and clamp, while its lower end remains free, substantially as shown.

2. The combination of the saw-plate C, having the projection $c$, and a recess formed by the lines $d\ e$ just below it, the removable tooth A, having a recess in its rear edge to receive the projection $c$, and the clamping-plate B, the upper end of the tooth alone being clamped between the saw and clamping plates, while its lower end is separated from the saw-plate, substantially as set forth.

In testimony whereof I affix my signature in presence of two witnesses.

ANDREW KRIEGER.

Witnesses:
 CYRUS HULING,
 J. R. BOWDLE.